May 9, 1933.  E. ÖMAN  1,908,615
METHOD OF UTILIZING EXHAUST GAS HEAT IN THE MANUFACTURE OF SULPHITE
CELLULOSE, AND OF SIMULTANEOUSLY RECOVERING SULPHUROUS ACID
Filed Feb. 21, 1931
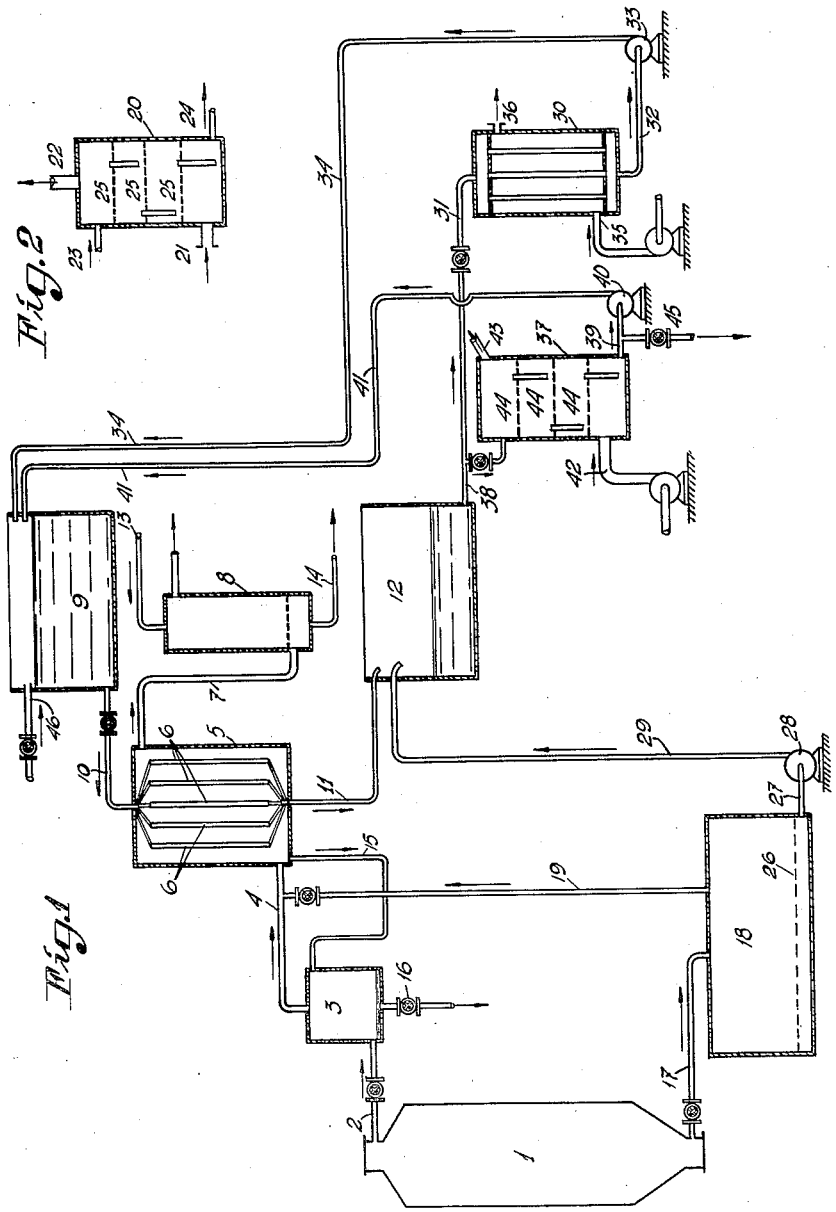
Inventor
Erik Oman
per *illegible signature*
Attorney Patented May 9, 1933

1,908,615

UNITED STATES PATENT OFFICE

ERIK ÖMAN, OF STOCKSUND, SWEDEN, ASSIGNOR TO INDUSTRIKEMISKA AKTIEBOLAGET, OF STOCKHOLM, SWEDEN, A SWEDISH JOINT-STOCK COMPANY

METHOD OF UTILIZING EXHAUST GAS HEAT IN THE MANUFACTURE OF SULPHITE CELLULOSE, AND OF SIMULTANEOUSLY RECOVERING SULPHUROUS ACID

Application filed February 21, 1931, Serial No. 517,546, and in Sweden February 21, 1930.

In the manufacture of sulphite cellulose great quantities of heat escape in the degassing of the digesters. It is true that sulphurous acid is recovered in the beginning of the degassing process, in that the gases are conducted into acid receptacles, if desired upon previous cooling, whereby the acid is simultaneously preheated; still, it is only a part of the heat escaping in the degassing process which is utilized in this manner. Likewise, only a portion of the escaping sulphurous acid is recovered in this way. In addition, the whole of the heat quantity escaping in the blowing of the digester will be entirely lost.

According to the present invention, the heat escaping from the digester, i. e. the steam escaping in the degassing process as well as in the blowing process, may be used for evaporating purposes, while the sulphurous acid of the exhaust gases is being recovered at the same time.

The invention is illustrated diagrammatically in Figure 1 of the accompanying drawing. Here, 1 designates a sulphite digester. In the degassing of the same gases are drawn off through the gas conduit 2, while in the blowing operation the contents of the digester are drawn off through the conduit 17 down into the receptacle 18. The gases escaping through the conduit 2 are conducted to a receptacle 3 containing condensate, from which receptacle the gases are conducted through the conduit 4 to a condenser 5, which is provided with cooling elements 6 in the embodiment shown in Figure 1. The gases which are not condensed in the condenser 5 and which substantially consist of sulphurous acid flow through the gas outlet 7 into an absorption apparatus 8, where sulphurous acid is absorbed in water or sulphite acid which is supplied through the conduit 13 and escapes through the conduit 14. In the embodiment shown in Figure 1, condensation of the vapors takes place in the condenser 5 by indirect cooling with liquid. Preferably, this exchange of heat takes place in counter-current. The cooling liquid may evidently consist of water, it being preferred, however, for this purpose to use the solution to be concentrated, such as sulphite waste lye. A receptacle 9 contains such solution, the temperature of which should be suitable for the purpose of obtaining effective cooling in the condenser thereby. From the receptacle 9, the solution is conducted through the supply conduit 10 to the cooling elements 6 in the condenser 5. Here, the solution is heated, after which it escapes through the outlet conduit 11 to a receptacle 12. When the contents of the digester are "blown" down into the receptacle 18, considerable quantities of vapor will escape through the gas discharge conduit 19 and thence into the condenser 5 where the vapors are condensed, while the non-condensable gases flow further through the conduit 7 to the absorption apparatus 8. The heat escaping from the digester 1, i. e. the heat escaping through the conduit 2 in the degassing operation as well as the heat escaping through the conduit 19 in the blowing operation, will then be absorbed by the cooling liquid in the condenser 5, so that the temperature of the latter rises (from the receptacle 9 to the receptacle 12). For example, the temperature of this solution may rise from about 40° in the receptacle 9 to about 90° in the receptacle 12.

The condensate from the condenser 5 escapes through the conduit 15 to the condensate receptacle 3. In the beginning of the degassing of the digester, when the percentage of sulphurous acid of the gases is great, this condensate holds considerable quantities of sulphurous acid. This condensate is therefore collected in the receptacle 3, in order to be liberated here from the major portion of the sulphurous acid contained therein, this being attained if the gases from the digester 1 are conducted through the conduit 2 into the receptacle 3 at the bottom thereof, so that these gases will have an expelling effect on the sulphurous acid which is dissolved in the condensate in said receptacle 3. This will take place particularly toward the end of the degassing period when the vapors from the digester 1 hold a small percentage of sulphurous acid. Through the drain cock 16 the condensate may be drawn off the receptacle 3, and the heat contents thereof may be utilized in any suitable manner.

According to the embodiment shown in Fig. 1, the condenser 5 is constructed as an indirect cooler; it is also possible, however, to arrange it for direct cooling. This construction is shown in Fig. 2. Here, 20 is the condenser in question, the gases entering the same through the pipe 21, while the non-condensable gases (sulphurous acid) escape through the pipe 22. Cooling liquid from the receptacle 9 is introduced through the conduit 23 and escapes through the conduit 24 to the receptacle 12. One or more perforated partitions 25 are provided within the condenser 20, said partitions having layers of liquid on them. When the vapors are pressed through this liquid layer the steam is condensed in known manner and heats the liquid which, preferably, consists of water.

By this arrangement it will be possible to heat the liquid, such as water, to a temperature slightly lower than 100°.

The solution or the water obtained in the receptacle 12 contains the heat recovered from the digester. This heat is now utilized in known manner for evaporation. If the liquid in the receptacle 12 consists of water, the utilization is preferably effected in such manner that a part of its heat contents is transmitted by an indirect exchange of heat, for instance in a counter-current cooler 30, onto the liquid to be evaporated, whereupon the evaporation from this liquid takes place with the aid of air or other gases. The hot water is introduced into the counter-current cooler 30 through the conduit 31, escapes through the conduit 32, and is returned by means of the pump 33 through the conduit 34 to the receptacle 9. The solution to be heated is introduced through the intake 35 and escapes through the outtake 36.

On the other hand, if the liquid in the receptacle 12 consists of the liquid to be concentrated, the latter preferably flows directly for evaporation by air or other gases. This preferably takes place in an evaporator 37, wherein the solution is introduced through the supply conduit 38 and whence it escapes through the discharge pipe 39, and is returned by means of the pump 40 through the pipe 41 to the receptacle 9. Air or other gas is introduced into the evaporator 37 through the intake 42 and escapes through the outlet 43. The evaporator 37 is provided with one or more partitions 44 devised in such a manner that the gases are pressed through the liquid layer. A portion of the liquid is then vaporized, and the vapors thus forming flow with the gases and are removed from the evaporator together with the same. The liquid and the gas, or the gas-vapor mixture respectively, are preferably caused to flow in counter-current within the evaporator. The air-vapor mixture thus obtained on the evaporation of the liquid, and which air-vapor mixture escapes at 43, may be used in known manner as a heat deliverer in another evaporating unit consisting of a heater or heaters and an evaporator or evaporators, and so forth. By the recovery of heat from the liquid in the receptacle 12, which is effected in either one of the above-mentioned ways, this liquid is cooled. The liquid thus cooled, the temperature of which is 40°, for example, is preferably used anew as cooling liquid in the condenser, that is to say, the cooled liquid is returned to the receptacle 9. In case the liquid in the receptacle 12 consists of the solution to be concentrated, a certain quantity of fresh solution must evidently be supplied, which is effected through the supply conduit 46, while a certain quantity of concentrated solution is drawn off the system through the discharge pipe 45. Obviously, it is not necessary in the operation of the process to provide storage vessels for solution or water respectively, i. e. 9 and 12 in Fig. 1, inasmuch as the solution may pass from the heater 5 directly to the evaporator 37 and, if water is used, the latter may pass directly to the heat exchanger 30, whereupon the solution or the water respectively may be returned to the heater directly. By reason of the intermittent supply of the heat (in degassing and blowing) it is preferred, however, to work with reserves of cold and hot solution respectively, whereby the apparatus will be capable of accumulating heat.

In the manner hereinbefore described, the heat escaping from the digester 1 in the form of vapor may thus be utilized for evaporation. At the same time the sulphurous acid is recovered more efficiently than hitherto, without the acid being diluted with the water of condensation. As the quantity of heat obtained in degassing and blowing of sulphite digesters is available only periodically even in plants having a great number of digesters, as stated hereinbefore, it is evident that the quantity of liquid (in 12) which has been heated by means of vapor from a digester is preferably pretreated in the evaporating apparatus during the period passing until degassing and blowing of the next digester. Hereby the hot liquid in the receptacle 12 will constitute the heat storer with which the evaporating apparatus has to operate during the time lapsing between two consecutive degassing and blowing operations.

In case the evaporating apparatus is intended for operation with sulphite lye, the lye escaping from the digester or from the pulp vessel should be cooled to a suitable temperature before it passes into the condenser 5 or into a heater disposed between the receptacles 12 and 9 to be heated therein, the temperature of said lye being nearly 100° when it is discharged from the digester. Said cooling is preferably effected by direct evaporation with air or gases in an apparatus similar to that shown in Fig. 2. Here, one preferably proceeds in such manner that the hot sulphite lye discharged from the pulp vessel 18 and collected underneath a strainer bottom 26 is caused to flow through the pipe 27 to a pump 28 adapted to pump the lye through the conduit 29 to the receptacle 12, wherein this lye is mixed with sulphite lye heated in the condenser 5, from which receptacle this mixture flows to the evaporator 37.

The above statements in regard to concentration of sulphite waste lye obviously also hold good with respect to sulphate waste lye.

What I claim is:

1. Apparatus for utilizing the heat units of the gases and vapors issuing from cellulose digesters during blowing and degassing thereof, including the combination, with a heat absorbing medium of a heat exchange means, means connecting said heat exchange means to said digesters in order to conduct escaping vapors to said heat exchange means and transfer the heat of said vapors to said medium, a container reservoir for said medium connected to said heat exchange means for storing heated medium, a second heat exchange means connected to said reservoir for recovering and utilizing the heat of the medium stored in said reservoir, a second container connected to said second heat exchange means for receiving the cooled medium and also connected to said first heat exchange means, and circulation pumps for said medium.

2. The method of recovering and utilizing heat units liberated during the degassing and blowing of cellulose digesters, which consists in transferring the heat units by heat exchange from the gases and vapors from the digesters to a heat absorbing medium consisting of a liquid, conducting said medium to a container, whereby to store heat therein and utilize the same as a reservoir, continuously withdrawing and recovering heat units from said reservoir for performing useful work during the interval between two consecutive blowings of the digesters, by evaporating a liquid and utilizing the heat absorbing medium as the liquid to be evaporated, and effecting the heat exchange between the gases and vapors of the digesters and the said medium by interposing a partition therebetween.

3. The method of recovering and utilizing heat units liberated during the degassing and blowing of cellulose digesters, which consists in transferring the heat units by heat exchange from the gases and vapors from the digesters to a heat absorbing medium consisting of a liquid, conducting said medium to a container, whereby to store heat therein and utilize the same as a reservoir, continuously withdrawing and recovering heat units from said reservoir for performing useful work during the interval between two consecutive blowings of the digesters, by evaporating a liquid distinct from the heat absorbing medium, and effecting the heat exchange between the gases and vapors of the digesters and said medium by bringing the same into direct mutual contact.

4. The method of recovering and utilizing heat units liberated during the degassing and blowing of cellulose digesters, which consists in transferring the heat units by heat exchange from the gases and vapors from the digesters to a heat absorbing medium consisting of a liquid, conducting said medium to a container, whereby to store heat therein and utilize the same as a reservoir, continuously withdrawing and recovering heat units from said reservoir for performing useful work during the interval between two consecutive blowings of the digesters, by directly evaporating warm liquid from said reservoir and effecting said evaporation by causing a permanent gas and said liquid to flow differently with respect to each other.

5. The method of recovering and utilizing heat units liberated during the degassing and blowing of cellulose digesters, which consists in transferring the heat units by heat exchange from the gases and vapors from the digesters to a heat absorbing medium consisting of a liquid, conducting said medium to a container, whereby to store heat therein and utilize the same as a reservoir, continuously withdrawing and recovering heat units from said reservoir for performing useful work during the interval between two consecutive blowings of the digesters, by evaporating a liquid distinct from the heat absorbing medium, and effecting the heat exchange between the liquid to be evaporated and the heat absorbing medium by interposing a partition and moving said liquids relatively to each other.

6. The method of recovering and utilizing heat units liberated during the degassing and blowing of cellulose digesters, which consists in transferring the heat units by heat exchange from the gases and vapors from the digesters to a heat absorbing medium consisting of a liquid, conducting said medium to a container, whereby to store heat therein and utilize the same as a reservoir, continuously withdrawing and recovering heat units from said reservoir for performing useful work during the interval between two consecutive blowings of the digesters, by accumulating the heat absorbing medium in the reservoir, continuously withdrawing from said reservoir and cooling said medium, conducting the cooled medium to a separate container and accumulating the same therein, conducting the medium from said container during the degassing and blowing of the digesters to a heat exchange apparatus whereby to receive the heat units of the gases and vapors of said digesters and then conveying the heated medium to the reservoir.

7. The method of recovering and utilizing heat units liberated during the degassing and blowing of cellulose digesters, which consists in transferring the heat units by heat exchange from the gases and vapors from the digesters to a heat absorbing medium consisting of a liquid, conducting said medium to a container, whereby to store heat therein and utilize the same as a reservoir, continuously withdrawing and recovering heat units from said reservoir for performing useful work during the interval between two consecutive blowings of the digesters, by evaporating a liquid and thereby transferring said heat units to a mixture of steam and permanent gases, and again utilizing said heat units by bringing said steam and gas mixture into indirect heat exchange contact with the liquid to be evaporated and thereby condensing said steam and transferring the heat units to said liquid.

8. The method of recovering and utilizing heat units liberated during the degassing and blowing of cellulose digesters, which consists in transferring the heat units by heat exchange from the gases and vapors from the digesters to a heat absorbing medium consisting of a liquid, conducting said medium to a container, whereby to store heat therein and utilize the same as a reservoir, continuously withdrawing and recovering heat units from said reservoir for performing useful work during the interval between two consecutive blowings of the digesters, by directly evaporating warm liquid from said reservoir and effecting said evaporation by bringing a permanent gas and said liquid into heat conductive contact with each other.

9. The method of recovering and utilizing heat units liberated during the degassing and blowing of cellulose digesters, which consists in transferring the heat units by heat exchange from the gases and vapors from the digesters to a heat absorbing medium consisting of a liquid, conducting said medium to a container, whereby to store heat therein and utilize the same as a reservoir, continuously withdrawing and recovering heat units from said reservoir for performing useful work during the interval between two consecutive blowings of the digesters, by evaporating a liquid distinct from the heat absorbing medium, and effecting the heat exchange between the liquid to be evaporated and the heat absorbing medium by interposing a partition between them.

ERIK ÖMAN